(12) United States Patent
Fukumori et al.

(10) Patent No.: US 6,573,967 B2
(45) Date of Patent: Jun. 3, 2003

(54) LIQUID CRYSTAL DISPLAY APPARATUS AND METHOD FOR FABRICATING THE SAME

(75) Inventors: Hiromi Fukumori, Miyazaki (JP); Hirohide Fukumoto, Kagoshima (JP); Kouichi Taniguchi, Kagoshima (JP); Syuichi Shima, Kanagawa (JP)

(73) Assignee: Sony Corporation, Tokyo (JP)

( * ) Notice: Subject to any disclaimer, the term of this patent is extended or adjusted under 35 U.S.C. 154(b) by 226 days.

(21) Appl. No.: 09/733,462

(22) Filed: Dec. 8, 2000

(65) Prior Publication Data

US 2001/0004278 A1 Jun. 21, 2001

(30) Foreign Application Priority Data

Dec. 9, 1999 (JP) .......................................... 11-350027

(51) Int. Cl.[7] ........................................... G02F 1/1336
(52) U.S. Cl. ...................................................... 349/153
(58) Field of Search ........................................... 349/153

(56) References Cited

U.S. PATENT DOCUMENTS 5,517,344 A * 5/1996 Hu et al. .................... 349/149
6,137,559 A * 10/2000 Tanaka et al. ............... 349/153
6,219,126 B1 * 4/2001 Von Gutfeld ................ 349/153
6,222,603 B1 * 4/2001 Sakai et al. .................. 349/153
6,424,394 B1 * 7/2002 Morii ........................... 349/110

FOREIGN PATENT DOCUMENTS

| JP | 04243229 A | * | 8/1992 | ......... G02F/1/1339 |
| JP | 04267224 A | * | 9/1992 | ......... G02F/1/1339 |
| JP | 05173150 A | * | 7/1993 | ......... G02F/1/1341 |

* cited by examiner

Primary Examiner—James Dudek
(74) Attorney, Agent, or Firm—Robert J. Depke; Holland & Knight LLC

(57) ABSTRACT

A liquid crystal display apparatus has a drive substrate and a facing electrode substrate superimposed and joined each other via spacers and seal materials, wherein the drive substrate carries drive devices for driving liquid crystal material, the facing electrode substrate carries facing electrodes facing to the drive devices. Liquid crystal material is injected between the drive substrate and the facing electrode substrate. The seal materials include an outer seal formed along outer periphery of the drive substrate and the facing electrode substrate and inner seals formed inside of the outer seal, and a space between the out side part of an effective picture element area having drive devices and an inside portion of the outer seal facing to the effective picture element area or an inside portion of the inner seal can be formed in approximately uniform.

11 Claims, 4 Drawing Sheets

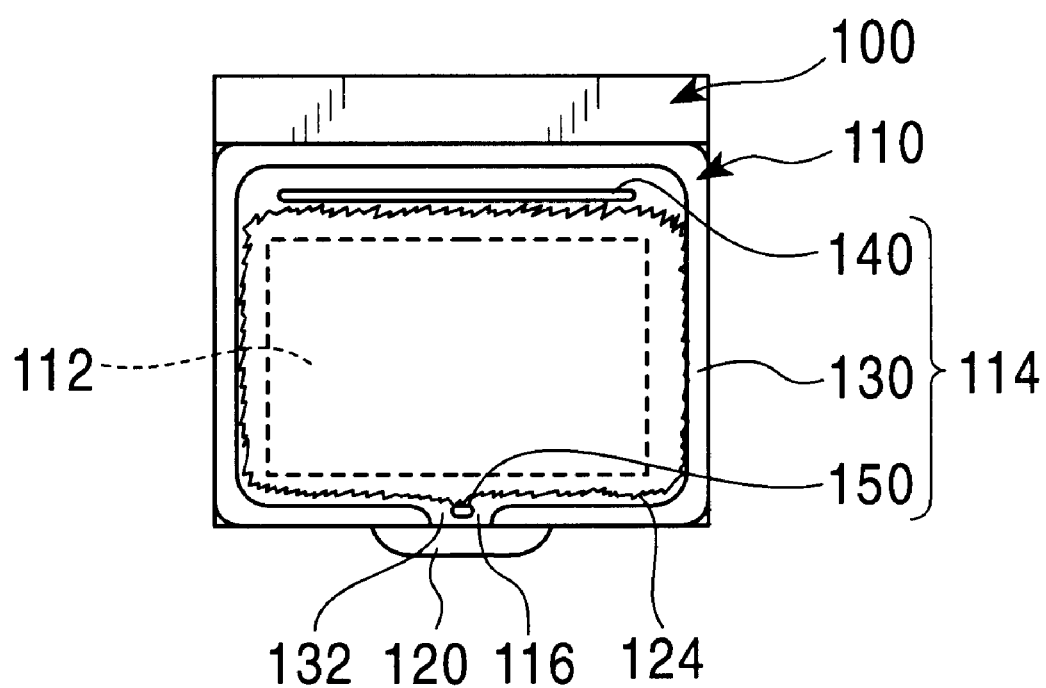

LIQUID CRYSTAL DISPLAY APPARATUS AND METHOD FOR FABRICATING THE SAME

BACKGROUND OF THE INVENTION

1. Field of the Invention

This invention relates to a structure of seal materials to seal liquid crystal material injected between a facing electrode substrate carrying a facing electrode and a drive circuit substrate carrying a drive circuit of a liquid crystal display apparatus, and further relates to a method for fabricating a liquid crystal display apparatus having such structure of the seal materials.

2. Description of the Related Art

In a liquid crystal display apparatus, a drive circuit substrate carrying TFT (Thin Film Transistor) devices for driving liquid crystal material and a facing electrode substrate carrying a facing electrode to be faced to each of the TFT devices are piled together with a spacer and seal materials. The liquid crystal material is then injected in a space between the above mentioned drive circuit substrate and facing electrode substrate through an injection gate provided at one portion of the seal materials.

FIG. 3A is a plan view for showing a seal structure employed in a conventional liquid crystal display apparatus and FIG. 3B is a sectional view taken along a line IIIB—IIIB of the conventional liquid crystal display apparatus depicted in FIG. 3A.

In a following discussion, a direction of an arrow α is called an upper side, an opposite direction thereof is called a lower side, a direction of an arrow β is called a left side and an opposite side thereof is called a right side.

As shown in FIG. 3A, a rectangular effective picture element area 12 is positioned at a central part of a rectangular facing electrode substrate 10 and a plurality of facing electrodes and an orientation film are provided (not shown in the figure) on this facing electrode substrate 10 within this effective picture element area 12. Seal materials 14 are arranged at peripheries of this effective picture element area 12. These seal materials 14 are formed in a rectangular shape along peripheries of the effective picture element area 12 like a rectangular picture frame.

These seal materials 14 are formed almost all peripheries of the effective picture element area 12 except a portion of an injection gate 16 for injecting the liquid crystal material. In addition, the injection gate 16 is to be sealed from outside by a sealant 20 after injection of the liquid crystal material into a space between the facing electrode substrate 10 and a drive circuit substrate 1.

In addition, an electrode portion 18 to connect this liquid crystal display apparatus to an outside circuit by a connector (not shown in the figure) is provided on the upper side of the drive circuit substrate 1.

Then the facing electrode substrate 10 is piled on the drive circuit substrate 1 with afore-mentioned predetermined space by way of the above mentioned seal materials 14 and a plurality of spacers supported by the seal materials 14, in which each of the spacers may be a small ball. Both the facing electrode substrate 10 and the drive circuit substrate 1 are joined together by hardening of the seal materials 14.

By the way, spaces between the effective picture element area 12 and the seal materials 14 surrounding peripheries of the effective picture element area 12 is not uniform in the conventional liquid crystal display apparatus.

In other words, in FIG. 3A, a space between an upper side periphery of the effective picture element area 12 and an upper side of the seal materials 14 is defined as A' and a space between a left or right side periphery of the effective picture element area 12 and a left or right side of the seal materials 14 is defined as B'. In this case, the space A' and the space B' are not equal and in FIG. 3A, the space A' is larger than the space B' (A'>B'). This is because wiring for the above described electrode portion 18 and a peripheral circuit portion for driving TFT devices are concentrated near the upper side of the drive circuit substrate 1. These TFT devices are mounted on the drive circuit substrate 1.

However, when the space between the effective picture element area 12 and the seal materials 14 shows non-uniform, uniformity of the space between the facing electrode substrate 10 and the drive circuit substrate 1 in the effective picture element area 12 is deteriorated in case of jointing both facing electrode substrate 10 and the drive circuit substrate 1.

In addition, in the conventional seal materials of the liquid crystal display apparatus, a portion of the seal materials are removed at the injection gate 16 for injecting liquid crystal material and this removed portion also causes the non-uniformity of the space between the facing electrode substrate 10 and the drive circuit substrate 1 in the effective picture element area 12.

Quality of the liquid crystal display apparatus is deteriorated by this non-uniformity of the space between the facing electrode substrate 10 and the drive circuit substrate 1 in the effective picture element area 12.

FIG. 4 is an illustration showing the condition where an interference fringe is observed by irradiation of a sodium vapor lamp to the conventional liquid crystal display apparatus that has non-uniform space between the facing electrode substrate 10 and the drive circuit substrate 1.

As shown in FIG. 4, an interference fringe 24 is observed with curved form along peripheries of the effective picture element area 12. And further the interference fringe 24 is invaded even into the effective picture element area 12, so that it is understood that the space between the facing electrode substrate 10 and the drive circuit substrate 1 is not uniform.

In order to correct the non-uniformity of the space between the facing electrode substrate 10 and the drive circuit substrate 1, the space between the outer periphery of the effective picture element area 12 and the inner periphery of the seal materials 14 is set to be uniform by enlarging partially the width of the seal materials 14. But in this case, it is probable to occur a disorder of the orientation between the seal materials and the liquid crystal material, so that there is a problem that the facing electrode substrate 10 and the drive circuit substrate 1 have to be put on one another with increased pressure.

In addition, another spacer is may be provided in the effective picture element area 12 at the facing electrode substrate 10 and the drive circuit substrate 1, but in the case where the additional spacer is formed by a TFT fabrication processing at boundaries of the picture element of the drive circuit substrate 1, it becomes more difficult to correct the non-uniformity of the space between the facing electrode substrate 10 and the drive circuit substrate 1 because of the strength of the liquid crystal display apparatus.

SUMMARY OF THE INVENTION

A primary object of the present invention is to present a liquid crystal display apparatus having a new structure of seal materials which can improve an uniformity of a space between a drive circuit substrate and a facing electrode substrate in an effective picture element area and a method for fabricating such liquid crystal display apparatus.

In order to achieve the above object, a liquid crystal display apparatus of a type having a drive substrate and a facing electrode substrate superimposed and joined each other via spacer and seal material is disclosed. The drive substrate carries drive devices for driving liquid crystal material, the facing electrode substrate carries facing electrodes facing to the drive devices, and the liquid crystal material is injected between the drive substrate and the facing electrode substrate, wherein the seal material includes an outer seal formed along outer peripheries of the drive substrate and the facing electrode substrate and an inner seal formed inside of the outer seal, and a space between the out side portion of an effective picture element area constituting drive devices and an inside portion of the outer seal facing to the effective picture element area or an inside portion of the inner seal can be formed in approximately uniform.

In the liquid crystal display apparatus of this invention, the seal materials seal a space between the drive circuit substrate and the facing electrode substrate when the drive circuit substrate and the drive circuit substrate are superimposed and joined each other.

The seal materials include an outer seal and an inner seal, and the outer seal is formed along outer peripheries of the drive circuit substrate and the facing electrode substrate. In addition, the inner seal is partially arranged at inside of this outer seal.

In such seals as described, the space between the outside portion of an effective picture element area having drive devices and an inside portion of the outer seal facing to the effective picture element area or an inside portion of an inner seal can be formed in approximately uniform.

Accordingly it becomes possible to superimpose the drive circuit substrate and the facing electrode substrate each other smartly by using seal materials having pattern as described above, and particularly the drive circuit substrate and the facing electrode substrate are joined with proper pressure at the effective picture element area, so that the space between two substrates can be kept uniform at the effective picture element area of the liquid crystal display apparatus. Resultantly, the quality of the liquid crystal display apparatus can be improved by improving the uniformity of the space between the drive circuit substrate and the facing electrode substrate at the effective picture element area.

BRIEF DESCRIPTION OF THE DRAWINGS

The foregoing and other objects, features and advantages of the present invention will be apparent to those skilled in the art from the following description of the presently preferred exemplary embodiments of the invention taken in connection with the accompanying drawings, in which:

FIG. 2 is an illustration showing the condition that an interference fringe is observed by irradiation of a sodium vapor lamp to the liquid crystal display apparatus that has uniform space between two substrates;

DESCRIPTOION OF THE PREFERRED EMBODIMENTS

Here in after is an explanation for one embodiment of a liquid crystal display apparatus according to this invention.

Figure 1A:
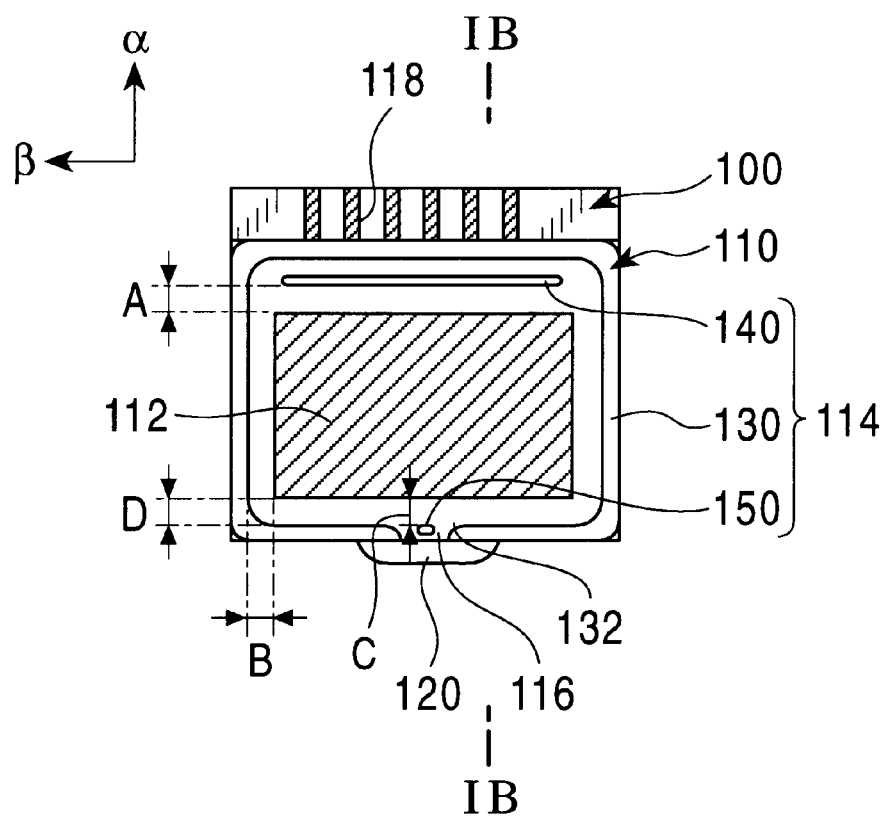
FIG. 1A is a plan view showing a structure of the liquid crystal display apparatus of this invention.
Figure 1B:
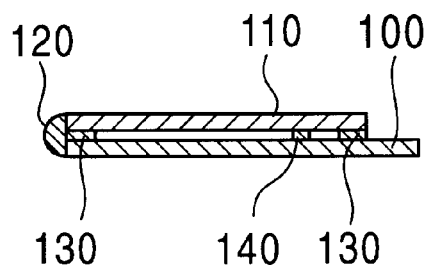
FIG. 1B is a sectional view of the liquid crystal display apparatus taken along a line IB—IB in FIG. 1A.
Figure 3A:
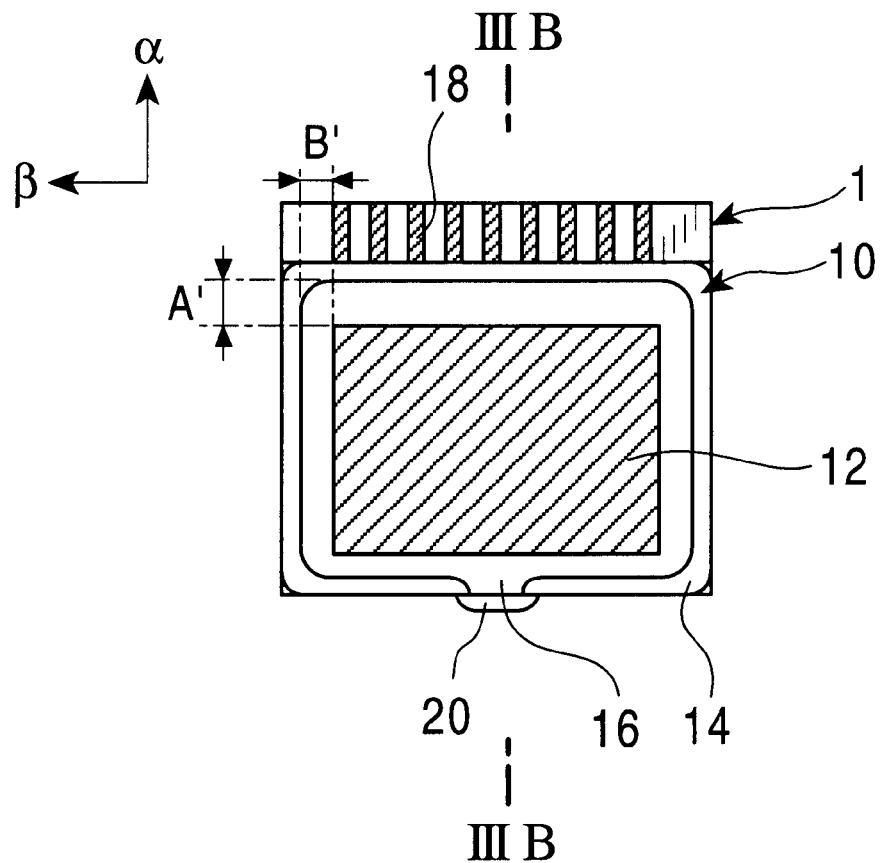
FIG. 3A is a plan view showing a seal structure employed in a conventional liquid crystal display apparatus.
Figure 3B:
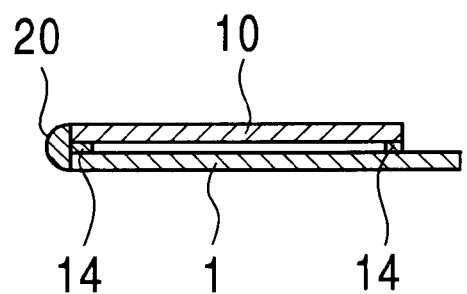
FIG. 3B is a sectional view of the conventional liquid crystal display taken along a line IIIB—IIIB in FIG. 3A.
Figure 4:
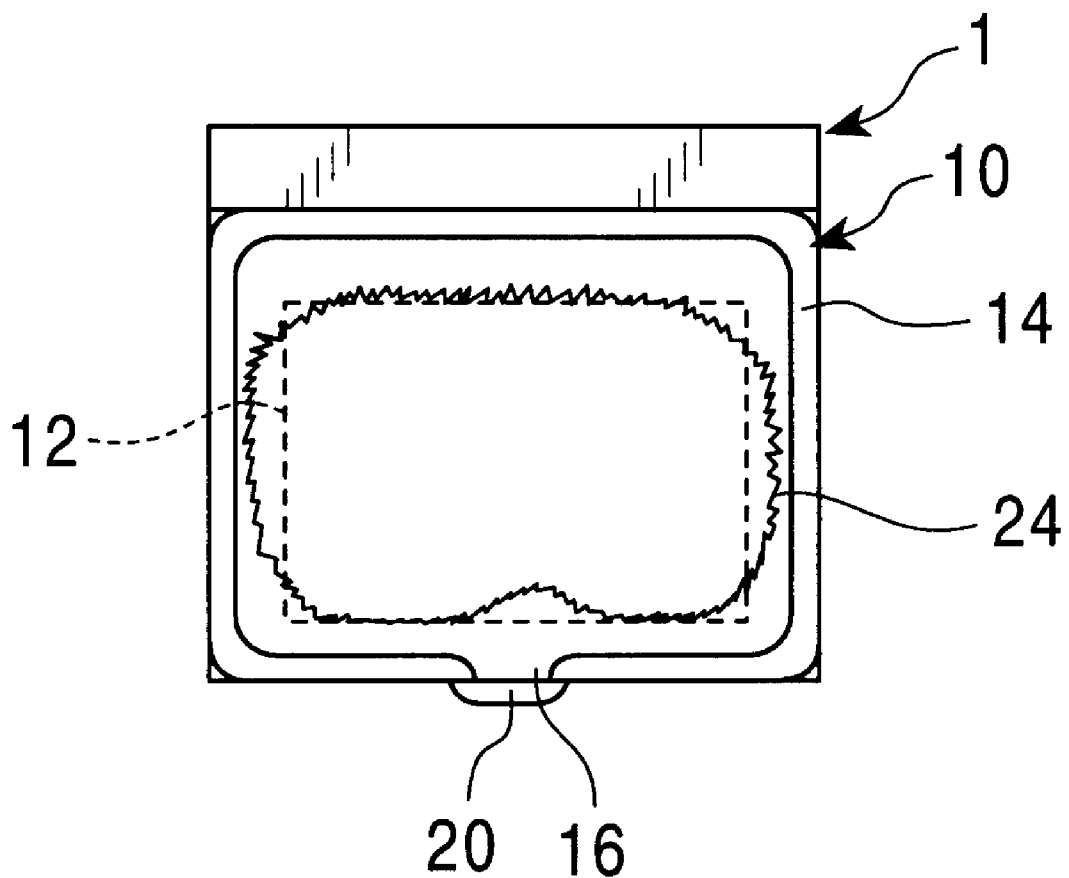
FIG. 4 is an illustration showing the condition where an interference fringe is depicted by radiation irradiation of a sodium vapor lamp to the conventional liquid crystal display that has non-uniform space between two substrates.

FIG. 1A is a plan view showing a structure of the liquid crystal display apparatus of this invention and FIG. 1B is a sectional view of the liquid crystal display apparatus taken along a line IB—IB in FIG. 1A. In the following discussion, a direction of an arrow α is called an upper side, an opposite direction thereof is called a lower side, a direction of an arrow β is called a left side and an opposite side thereof is called a left side.

In this liquid crystal display apparatus, an effective picture element area 112 of a rectangular shape is established in a central portion of a facing electrode substrate 110, and facing electrodes made of ITO (Indium Tin Oxide) and an orientation film are formed on the facing electrode substrate 110 in addition. On the other hand, TFT (thin film transistor) devices made of poly-silicon and an orientation film made of polyimide are formed on a drive circuit substrate 100. These facing electrode substrate 110 and the drive circuit substrate 100 are basically made of transparent plates such as glass substrates and display an image in the effective picture element area 112 with visible radiation of back light from back side of the liquid crystal display apparatus. Of course, the drive circuit board 100 having TFT devices may be replaced by a silicon substrate of a reflective type liquid crystal display apparatus.

In addition, between the facing electrode substrate 110 and the drive circuit substrate 100, plural stick shaped spacers are provided on the drive circuit substrate 100. Namely the stick shaped spacers made of organic resin are formed by the TFT fabrication processing on boundaries of each picture element within the effective picture element area 112 towards the facing electrode substrate 110.

In addition, an electrode portion 118 for electrically connecting the liquid crystal display apparatus to an outside circuit by way of a connector (not shown) is established in the upper side edge of the drive circuit substrate 100.

Incidentally, both the facing electrode substrate 110 and the drive circuit substrate 100 have more room at respective upper side edge of above the effective picture element area 112 than edges of the other sides (lower side and the both left and right sides), because as described before wiring for the electrode portion 118 and drive circuits for the TFT devices are concentrated in this room.

In addition, between the facing electrode substrate 110 and the drive circuit substrate 100, seal materials 114 are arranged to area along peripheral portion of the effective picture element area 112. These seal materials 114 are an outer seal 130 provided along with the outer peripheries of the facing electrode substrate 110 and the drive circuit substrate 100 and an inner seal 140 and another inner seal 150 partially provided within the inside of the outside seal 130.

For example, the seal materials 114 are formed by a silk screen printing process or a dispense system in a pattern on the facing electrode substrate 110, and the seal materials 114 are made of epoxy-resin mixed with granular materials in inside.

The outside seal 130 is formed in a rectangular frame having an equal width, and has a cutout portion 132 corresponding to an injection gate 116 to inject the liquid crystal material. The injection gate 116 is sealed by sealant 120 from outside after injection of the liquid crystal material.

In addition, the inner seal 140 is formed in a dot, for example, between the upper side portion of the effective picture element area 112 and the upper side portion of the outer seal 130, and formed along with the outer seal 130 in a linear line shaped.

A space A between the upper side of the effective picture element area 112 and a bottom side of the inner seal 140 is made equal a space B between right and left side of effective picture element area 112 and right and left side of the outer seal 130.

In addition, the inner seal 150 is made within the cutout portion 132 of the outer seal 130. A space C between the inner seal 150 and the lower side of the effective picture element area 112 is equal to a space D between the bottom of the effective picture element area 112 and the bottom of the outer seal 130.

This inner seal 150 has a dimension that does not obstruct injection of the liquid crystal material such as TN (Twisted Nematic) liquid crystal materials from being injected from the injection gate 116.

In the liquid crystal display apparatus as described above, the seal materials 114 are comprised of the outer seal 130 and two inner seals 140 and 150, so that the space between each periphery of the effective picture element area 112 and each of seals 130, 140 and 150 become almost uniform. Namely all spaces A, B, C and D are set to be preferably equal. Thereby the facing electrode substrate 110 and drive circuit substrate 100 can be piled with better balance by spacers mixed in the seal materials 114.

Accordingly the space between the facing electrode substrate 110 and the drive circuit substrate 100 can be uniformly maintained over the entire portion of the effective picture element area 112, thereby the quality of the liquid crystal display apparatus can be improved.

FIG. 2 is an illustration showing the condition that an interference fringe 124 is observed by irradiation of a sodium vapor lamp to the liquid crystal display apparatus that has uniform space between the facing electrode substrate 110 and the drive circuit substrate 100.

As shown in the figure, the interference fringe 124 is observed by straight status along the peripheral portions of the effective picture element area 112, and the interference fringe 124 shows, without invading into the effective picture element area 112, that the space between two substrates 100 and 110 is almost uniform.

A disposition pattern of the seal materials 114 in this invention is not limited to the example as shown in FIG. 1, and this disposition pattern can be changed in accordance with the construction of the liquid crystal display apparatus.

In addition, the above-mentioned embodiment is explained the liquid crystal display apparatus that uses TFT devices, but this invention can be applied to other type of Liquid Crystal such as a Ferro-Electric Liquid Crystal and a Liquid Crystal On Silicon. In addition, the configuration of the spacer is not restricted by the embodiment as described above.

As above described in the liquid crystal display apparatus of this invention, the patterns of seal materials are constituted with the outer seal formed along periphery of the facing electrode substrate and drive circuit substrate and the inner seal partially arranged in the inside of the outside seal, thereby the space between the out side part of the effective picture element area constituting active devices and the inside part of the outer seal facing to the effective picture element area or the inside part of the inner seal can be formed in approximately uniform.

What is claimed is:

1. A liquid crystal display apparatus having a drive substrate and a facing electrode substrate superimposed and joined to each other with spacer and seal material located therebetween, wherein said liquid crystal material is injected between said drive substrate and said facing electrode substrate, and further wherein said seal material includes an outer seal formed along an outer periphery of said drive substrate and said facing electrode substrate and an inner seal is formed inside said outer seal, and wherein the inner seal is located at least along a first edge of the effective picture element area and is substantially uniformly spaced apart at a first distance from the first edge of the effective picture element area and wherein side edges of the effective picture element area are substantially uniformly spaced apart at said first distance from corresponding side edges of the outer seal and an additional inner seal portion being located within a liquid crystal fill opening in the outer seal also being spaced apart from the effective picture element area substantially at said first distance.

2. The liquid crystal display apparatus as claimed in claim 1, wherein said outer seal is formed with width of approximately uniform at all peripheries.

3. The liquid crystal display apparatus as claimed in claim 1, wherein said inner seal is selectively disposed to a place where the excess amount of the outer periphery of said drive substrate and said facing electrode substrate relative to said effective picture element area.

4. The liquid crystal display apparatus as claimed in claim 1, wherein said effective picture element area is formed to be approximately a rectangular shape, said outer seal is also formed in a rectangular frame shape.

5. The liquid crystal display apparatus as claimed in claim 1, wherein said outer seal has a cutout portion corresponding to an injection gate for the liquid crystal material and said inner seal is disposed at said cutout portion.

6. The liquid crystal display apparatus as claimed in claim 1, wherein plural stick type spacers are formed on each boundary of each picture element of said effective picture element area on said drive substrate.

7. The liquid crystal display apparatus as claimed in claim 1, wherein granulated spacers are mixed in said outer seal and the inner seal of the seal materials.

8. The liquid crystal display apparatus as claimed in claim 1, wherein said seal materials are formed on said facing electrode substrate by patterning.

9. A liquid crystal display apparatus comprising:

a drive substrate on which drive devices are mounted;

a facing substrate facing said drive substrate; and liquid crystal materials injected between said drive substrate and said facing substrate with seal materials located therebetween, wherein said seal materials are comprised of an outer seal formed on an outer periphery of said drive substrate and said facing substrate and an inner seal disposed inside of said outer seal, and wherein the inner seal is located at least along a first edge of an effective picture element area and is substantially uniformly spaced apart at a first distance from the first edge of the effective picture element area and wherein side edges of the effective picture element area are substantially uniformly spaced apart at said first distance from corresponding side edges of the outer seal and an additional inner seal portion being located within a liquid crystal fill opening in the outer seal also being spaced apart from the effective picture element area substantially at said first distance.

10. A method for fabricating a liquid crystal display apparatus comprising the steps of:

providing inner and outer seal members between a drive substrate and a facing substrate;

jointing the drive substrate on which drive devices are mounted and said facing substrate by superimposing the substrates; and injecting liquid crystal materials between said drive substrate and facing substrate, wherein said step of providing inner and outer seal members is comprised of forming the inner and outer seal members such that the inner seal is located at least along a first edge of the effective picture element area and is substantially uniformly spaced apart at a first distance from the first edge of the effective picture element area and wherein side edges of the effective picture element area are substantially uniformly spaced apart at said first distance from corresponding side edges of the outer seal and an additional inner seal portion being located within a liquid crystal fill opening in the outer seal also being spaced apart from the effective picture element area substantially at said first distance.

11. A method for fabricating a liquid crystal display apparatus as claimed in claim 10, wherein a space between the outside portion of an effective picture element area having drive devices and an inside portion of said first seal facing to the effective picture element area or an inside portion of said second seal can be formed in approximately uniform.

* * * * *